(12) United States Patent
Fong et al.

(10) Patent No.: US 7,089,556 B2
(45) Date of Patent: Aug. 8, 2006

(54) SYSTEM AND METHOD FOR DYNAMIC SELF-DETERMINING ASYNCHRONOUS EVENT-DRIVEN COMPUTATION

(75) Inventors: Liana Liyow Fong, Irvington, NY (US); Donald Philip Pazel, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 09/874,065

(22) Filed: Jun. 6, 2001

(65) Prior Publication Data

US 2002/0188765 A1 Dec. 12, 2002

Related U.S. Application Data

(60) Provisional application No. 60/278,593, filed on Mar. 26, 2001.

(51) Int. Cl.
| | | |
|---|---|---|
| G06F 9/46 | (2006.01) | |
| G06F 15/173 | (2006.01) | |
| G06F 15/177 | (2006.01) | |
| G06F 7/60 | (2006.01) | |
| G06F 9/455 | (2006.01) | |

(52) U.S. Cl. .................. 718/102; 719/316; 719/317; 719/318; 709/220; 709/224; 709/246; 703/2; 703/25

(58) Field of Classification Search ........ 718/100–108; 719/316–318; 709/220–246; 703/2, 25
See application file for complete search history.

(56) References Cited

U.S. PATENT DOCUMENTS

| 6,063,126 | A * | 5/2000 | Borduin ..................... 703/2 |
| 6,105,147 | A * | 8/2000 | Molloy ..................... 714/16 |
| 6,279,046 | B1 * | 8/2001 | Armstrong et al. ............ 710/5 |
| 6,353,861 | B1 * | 3/2002 | Dolin et al. ................. 719/318 |
| 6,374,293 | B1 * | 4/2002 | Dev et al. .................... 709/220 |
| 6,393,386 | B1 * | 5/2002 | Zager et al. ................. 703/25 |
| 6,584,502 | B1 * | 6/2003 | Natarajan et al. ........... 709/224 |
| 6,789,257 | B1 * | 9/2004 | MacPhail .................... 719/316 |
| 6,795,868 | B1 * | 9/2004 | Dingman et al. ........... 709/246 |
| 6,820,135 | B1 * | 11/2004 | Dingman et al. ........... 709/246 |

OTHER PUBLICATIONS

Chelini et al., "An Example of Event-Driven Asynchronous Scheduling with ADA", ADA Letter, 1990, vol. X, No. 8, pp. 130-144.*
Barrett et al., "A Framework For Event-Based Software Intergration", ACM Transactions on Software Engineering and Methodology, vol. 5, No. 4, 1996, pp. 378-421.*

* cited by examiner

*Primary Examiner*—Thomas Lee
*Assistant Examiner*—Jennifer N. To
(74) *Attorney, Agent, or Firm*—Louis Herzberg, Esq.; Greenblum & Bernstein, P.L.C.

(57) ABSTRACT

A system and method which allows complex tasks to be scheduled and/or coordinated on one or more computer systems by focusing the level of autonomy to each phase of a plan. The phases include computational components and may spawn target phases such that the phases are dependent on the target phases. The phases may begin execution upon completion of the target phases. Each phase may determine further execution, including succeeding phases, in an event-driven manner.

20 Claims, 7 Drawing Sheets

SYSTEM AND METHOD FOR DYNAMIC SELF-DETERMINING ASYNCHRONOUS EVENT-DRIVEN COMPUTATION

CROSS REFERENCE TO RELATED APPLICATIONS

The present application claims priority under 35 U.S.C. §119 to U.S. provisional application Ser. No. 60/278,593 filed on Mar. 26, 2001.

BACKGROUND OF THE INVENTION

1. Field of the Invention

The present invention generally relates to software framework planning and, more particularly, to a system and method for process planning and execution of separate phases of a plan in order to schedule and/or coordinate complex tasks on one or more computer systems.

2. Background Description

Planning systems have been a long-standing research topic, typically stemming from the field of artificial intelligence. As such, the output over the years has been planning systems that aim at high-level problem solving. That is, research in this area has mainly focused on the determination and inferencing of sub-goals and deducing activity that can produce those goals. Generally this is achieved using backward or forward chaining techniques as described in "Reasoning About Plans", The Morgan Kaufman Series in Representation Reasoning, by Allen et al., 1991, Morgan Kaufman Publishers. Thus, planning systems have focused more on plan deduction rather than the actual management of the execution of the resulting plan.

Recent work has attempted to look at plan revision (see, "Applying Dynamic Planning Frameworks to Agent Goals" by Barber et al. AAAI, 1999). However, these attempts tend to solve the planning process as a central process, with the plan itself being a result of that process. Or, the planning revolves about goal-action inferencing techniques to re-plan execution at an agent level. In these attempts, the actual plan is an executable path towards some goal.

Other works on this subject include U.S. Pat. No. 5,329,626 to Klein et al. which is directed to a system and method for synchronizing portions of a distributed transaction. During the processing of a transaction, a number of agents are formed for handling various aspects or portions of the computations to be performed. Each agent progresses through a predefined set of state transitions which define the status of the agent at any point in time. The state transitions, in these agents, are dependent on the status of other ones of the cooperating agents. The computation management system of Klein et al. defines for each agent a set of dependencies, each dependency corresponding to one or more state transitions. By defining dependencies for each agent, Klein et al. is able to show how agents are interdependent, and set up necessary data structures to denote those interdependencies.

In U.S. Pat. No. 5,499,364 to Klein et al., as another example, a distributed computation system is provided which has a set of agents that perform each specified distributed computation. The event dependencies between events in the agents are dynamically specified at run time from a set of predefined dependency types. Each agent stores in its local knowledge database a representation of the conditions for local events, which are state transition events in that agent, and a representation of the conditions for those external events that depend on notifications of local events in this agent and for those external events on which the local events are dependent.

However, both of the Klein et al. references focus on how plan phases (agents) or external processes can cooperate through transactions. The issues of common state on conditions or blocking on state transitions are purely at the discretion of the plan phases (agents) themselves. What cannot be determine from the Klein et al. references, as well as other literature, are frameworks that address having the plan itself dynamically responding to changes and devising its own course of action.

SUMMARY OF THE INVENTION

It is therefore an object of the present invention to provide a system and method that allows the plan to dynamically respond to changes and devising its own course of action.

It is another object of the present invention to provide a system and method for planning software framework which is both internally and externally event driven.

It is still another object of the present invention to provide a system and method for planning software framework which is self-determining at the planning phase stage.

It is a further object of the present invention to provide a system and method for providing a general approach applicable to many domains, in reusing existing plans, and in extending inherently to distributed planning.

It is still an object of the present invention to provide a system and method for defining the execution of an individual phase of the plan.

It is also a further object of the present invention to provide a system and method which allows the ability to reuse plans as well as the ability to wait on external events without stopping execution.

The present invention relates to the area of planning software framework. These are software encapsulations of computing processes that, for example, planning systems typically start with a problem goal such as traversing a complex of connected mazes. Strategies are devised for each maze, and a total plan is launched, outlining the traversal of all the connected mazes. In cases of unexpected interference, for example, the plans need can be dynamically modified thereby devising its own course of action.

The present invention is distinguishable from other approaches by focusing the level of autonomy to each phase of a plan. In this manner, the system and method of the present invention is capable of gauging the progress of the phase and the determination of new phases of the plan. Moreover, each phase may asynchronously coordinate to external events. Thus, each phase may determine further execution, including succeeding phases, in an event-driven manner. Therefore, this encapsulation process in accordance with the present invention lends itself well to event-driven planning and more generally to distributed planning.

According to the invention, a method is provided for performing event-driven computations. The method includes providing cooperating source phases for performing computations and creating at least one target phase from at least one of the cooperating source phases. Both the cooperating source phases and the target phases perform computations. The method initiates an asynchronous transaction for specific phases of the target phase or the cooperating source phases with a remote agent or another phase such that events can be directed to the specific phases. The specific phases have the option to wait on completion of the asynchronous transaction and receipt of a message of external information prior to completion of the computations, and is capable of identifying the receipt message corresponding to the asynchronous transaction. A computer implemented code may be used to implement the steps of the present invention.

The present invention also includes a system for performing event-driven computations. In this system, a module provides cooperating source phases for performing computations and a module also provides at least one target phase created from at least one of the cooperating source phases. A further module initiates an asynchronous transaction for specific and separate phases of the at least one target phase or the cooperating source phases with a remote agent or another phase such that events can be directed to the specific and separate phases. Each of the specific and separate phases has the option to wait on completion of a transaction and receipt of a message of external information prior to completion of the computations, and is capable of identifying the receipt message corresponding to the asynchronous transaction.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
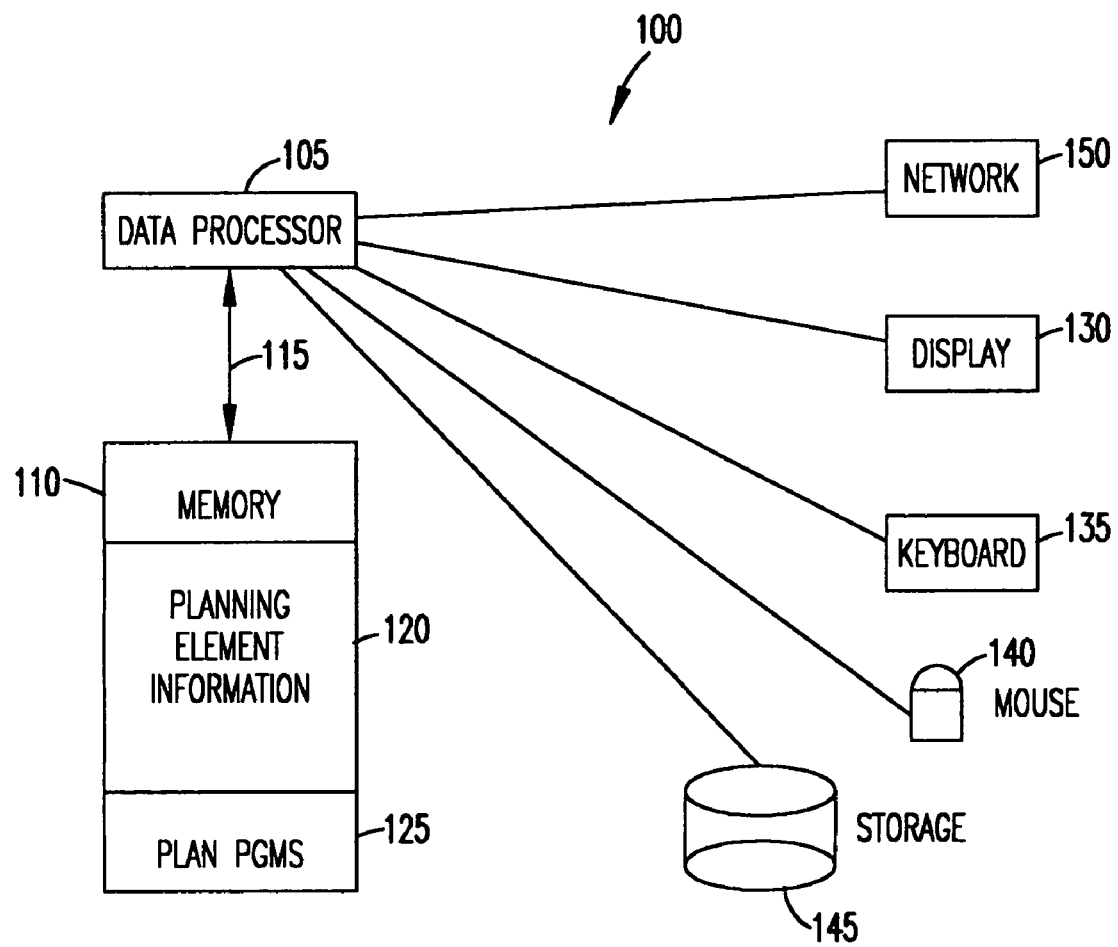
FIG. 1 is a block diagram of a data processing used to implement the system and method of the present invention.

Referring now to the drawings, and more particularly to FIG. 1, there is shown a block diagram of an exemplary data processing system which is used to implement the system and method of the present invention. It should be recognized by those of ordinary skill in the art that the data processing system of FIG. 1 is provided for illustrative purposes only, and that alternative data processing units are also contemplated for use with the present invention.

By way of example, one preferred embodiment of the data processing system of FIG. 1 is an Intellistation® computer manufactured and sold by International Business Machines, Corp. of Armonk, N.Y. However, other data processing systems may also be used such as a plurality of separate electronic circuits or devices (e.g., hardwired electronic or logic circuits, or programmable logic devices) or a suitable programmable general purpose computer (e.g., a microprocessor, microcontroller, or other processor device). In general, any device or assembly of devices on which a finite state machine capable of implementing the steps of the present invention as shown and described in the Figures may be used as a controller with the present invention.

Still referring to FIG. 1, the data processing system is generally depicted as 100 and includes a data processor 105 having a memory 110. The memory 110 is coupled to the data processor via a bi-directional bus 115. In embodiments of the present invention, the memory 110 may include program and data memory, as well as information about planning objects 120 (including data specific to the planning framework and data specific to the application of the planning in accordance with the present invention). The memory 110 may also include programs 125 for the planning framework, itself, and specifically for the application of the planning of the present invention.

A display 130 may be provided in order to display the graphical or textual information regarding the execution of the planning or details of the application of the present invention. A user data entry device 135 (e.g., keyboard or other interactive device) and a pointing device 140 (e.g., a mouse or trackball) may also be coupled to the data processor 105. An offline storage device 145 and a network system 150 may also be provided such that external events by the planning system are captured or planning elements may be retrieved, or several planning systems may be coordinated. Access to the network may be through a modem or similar network access devices.

Figure 2:
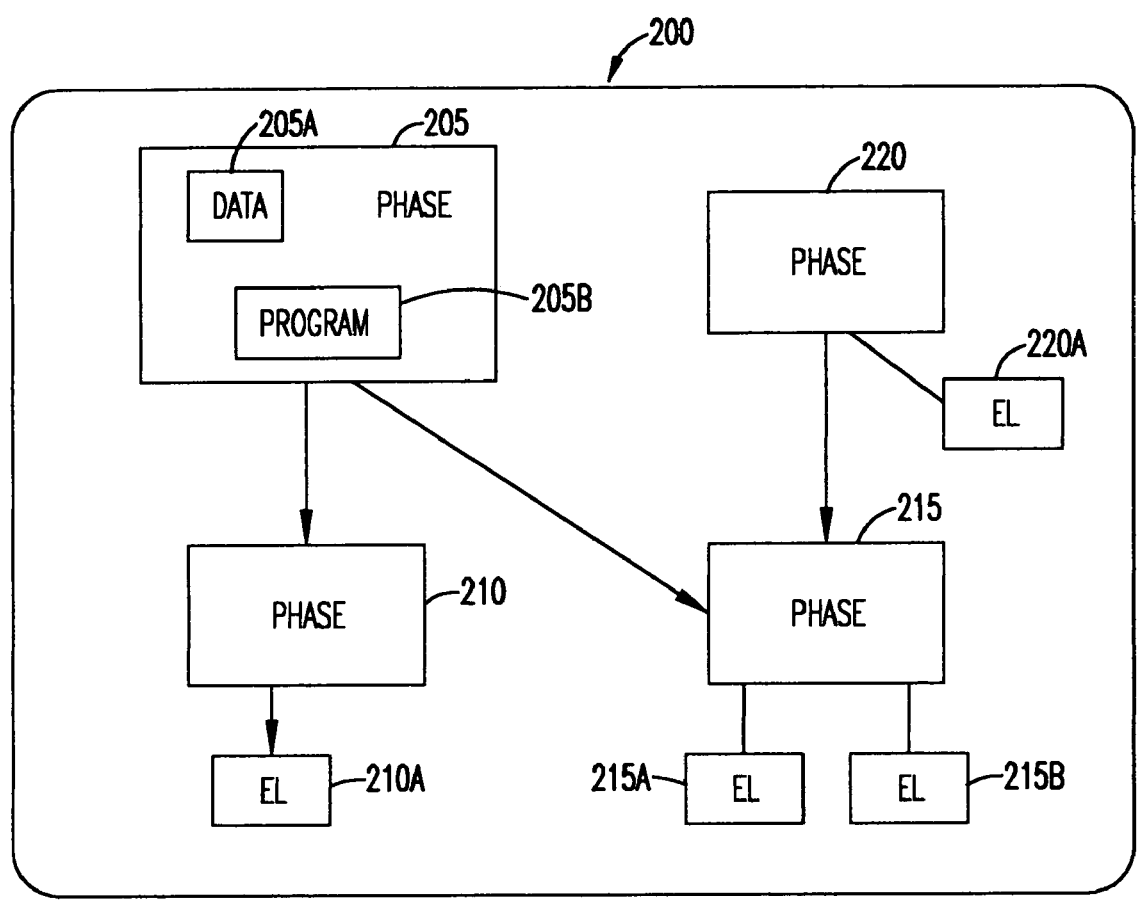
FIG. 2 is a block diagram of a set of data elements and a composite structure of a plan as implemented by the present invention.

FIG. 2 shows a set of data elements and a composite structure of a plan as implemented by the present invention. The present invention should not be limited to the specific number of data elements and composite structures shown in FIG. 2; it should thus be recognized that the present invention may implement more or less data elements and composite structures depending on the particular use of the present invention.

In FIG. 2, an overall plan is generally depicted as reference numeral 200, and includes a collection of separate data elements (hereinafter referred to as phases), each of which executes independently. In other words, a program may decompose into well-defined phases (typically in a hierarchical manner), where each phase may perform some processing. The phases may each include data relevant to the execution of the phase and an application program (where the plan is based on the application program). As discussed in more detail below, each phase may "spawn" other phases, each of which executes asynchronously or alternatively synchronously (i.e., waits on the completion of any of the spawned phases prior to its own execution). Depending on the program state or an external event, each phase may dynamically decide on any number of alternative phase generations, including retraction of spawned phases. The phases may also be driven by external events (e.g., event-driven).

Being more specific with reference to FIG. 2, phase 205 includes data 205a relevant to the execution of the phase 205 and an application program 205b, where the plan is based on the application program 205b. In a preferred implementation of the present invention, phases are based on the well-known program structuring techniques of object-oriented programming, whereby a phase is a well-defined base class relating to the generic planning framework and the application program and data reside in a derived class from the phase. Phases may also spawn other phases and optionally wait on them while forming dependencies in the form of a directed acyclic graph. For example, in FIG. 2, the phase 205 is dependent on phases 210 and 215, and phase 220 is dependent on only phase 215. In this scenario, for example, phase 205 may not execute until completion of both 210 and 215; however, phase 220 may execute after completion of only phase 215. Thus, in embodiments of the present invention, a phase that spawns other phases may be dependent on those phases for completion (of computations associated with the target) Phases 205 and 220 may be referred to as "cooperating source" phases, and phases 210 and 215 may be referred to as "target" phases.

The phases 210, 215 and 220 may also be event driven, e.g., may wait on external events prior to execution. In order to be event driven, the phases detect external events via event listeners. In FIG. 2, phase 210 has an event listener 210a, phase 215 has event listeners 215a and 215b and phase 220 has event listener 220a. In one embodiment of the present invention, the phase may request a reply to an external service and the service replies to the appropriate event listener.

Figure 3:
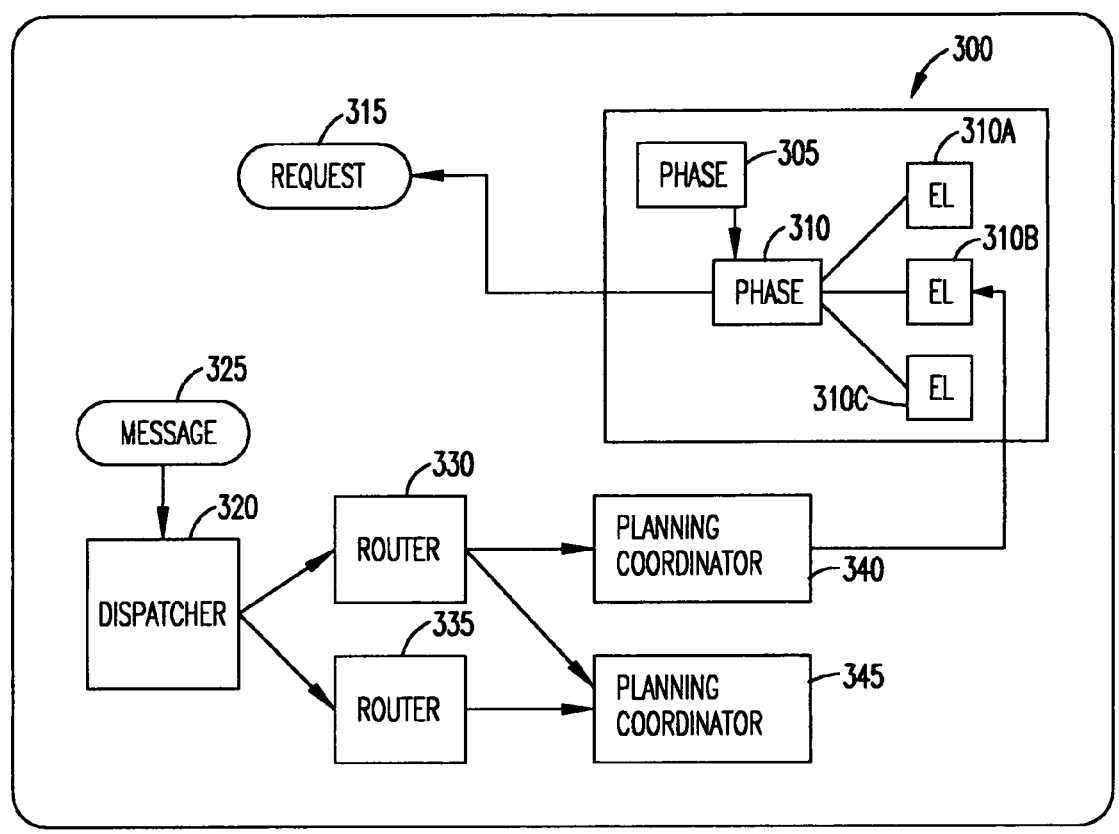
FIG. 3 is a block diagram and an event flow of the present invention.

FIG. 3 is a block diagram of a planning system of the present invention. A planning graph 300, similar to that described in FIG. 2, shows phase 305 and phase 310, with phase 305 being dependent on phase 310. Phase 310 includes three event listeners 310a, 310b and 310c. FIG. 3 further shows phase 310 sending a request 315 external to the planning process in order to initiate an external interaction. The phase 310 may then pause until it receives a message (i.e., completion of the external event). The request 315 includes a return address so that a reply can be sent back to the appropriate phase (e.g., 310).

A dispatcher 320 receives a message 325, in response to the request 315, and routes the message 325 to one of the identified routers 330 or 335. The message 325 includes planning address information that identifies (i) a planning coordinator, (ii) a phase and (iii) an event listener, so that the message can be correctly and efficiently routed thereto. The message 325 may be received inter-process or via the network, for example, through an application or operating system level component.

The message is then routed to an identified planning coordinator 340 or 345, depending on the message information. The planning coordinators 340 and 345 keep track of the execution of the plan and map incoming events to the event listeners of each phase. Then, the identified planning coordinator routes the message 325 to the identified event listener, in this example event listener 310b. The message information is then accessible from the phase 310 on further execution.

As described, FIG. 3 thus shows an event routing sub system which allows internal and external events to be directed to specific phases on specific plans. It is further noted from FIG. 3 that the planning system is preferably event-driven; that is, each phase obtains execution time by virtue of having received an event. However, the illustration of FIG. 3 does not preclude other execution policies such as, for example, a timer periodically firing in the planning coordinator which, in turn, selects a waiting phase for further execution. Also, it should be readily recognized that FIG. 3 is but one example of the implementation of the present invention, and should thus not be interpreted as a limiting embodiment. By way of example, more than two routers or planning coordinators may be used to implement the system and method of the present invention. Alternatively, as in FIG. 2, more or less phases or event listeners may also be provided depending on the particular use for implementing the present invention.

Figure 4A:
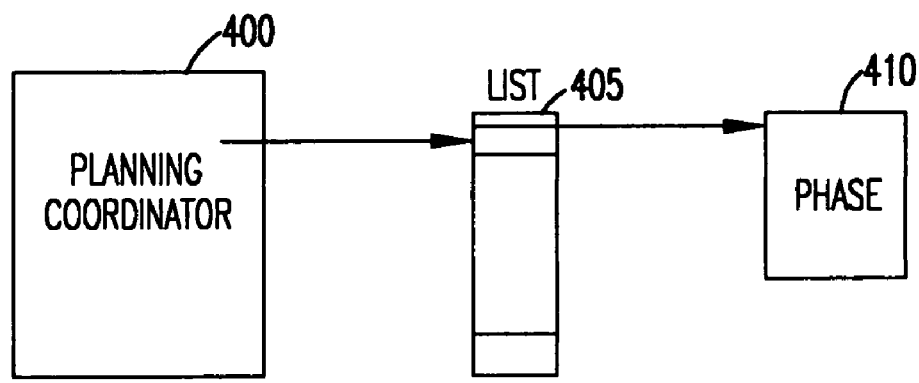
FIG. 4A shows data maintained by the planning coordinator in accordance with the present invention.
Figure 4B:
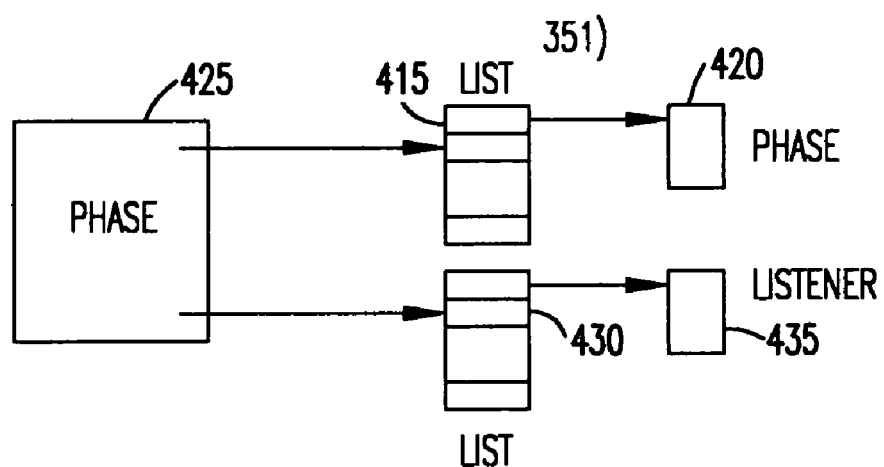
FIG. 4B shows data maintained by each phase in accordance with the present invention.

FIG. 4A shows data maintained by the planning coordinator. The planning coordinator 400 includes a list 405 of phases depicted as reference numeral 410. The phases 410 may be the currently executing phases. FIG. 4B shows data maintained by each phase in accordance with the present invention. In FIG. 4B, a dependent phase 425 includes a list 415 of phases 420. The phases 420 wait on the completion of dependent phase 425 prior to completion thereof. There is also a list 430 of event listeners 435 which wait for the events for phase 425.

Figure 5:
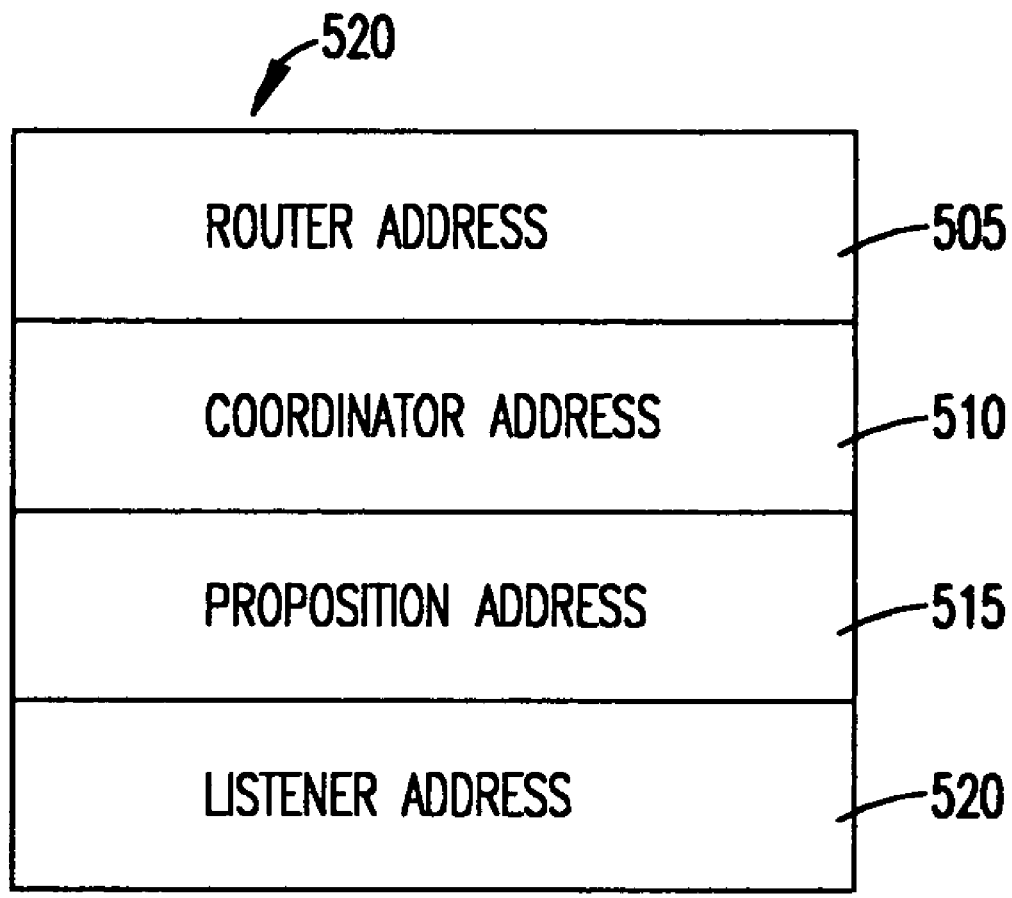
FIG. 5 shows addressing elements used with the present invention.

FIG. 5 shows details of message routing address information. This information may be found embedded within the structure of the message, itself. The message address information 500 includes, but is not limited to (i) an identification of the router 505, (ii) an identification of the planning coordinator 510, (iii) an identification of the phase 515 and (iv) an identification of the listener 520 to which this message is to be delivered. Variants to this format exist according to implementation such as, for example, if only one router exists then the router identification may be omitted from the message information. Also, identification may be implemented in any number of ways, again, depending on the system being implemented with the present invention. For example, in distributed systems, identification may be by universal identifiers; whereas in a single process system, memory addresses may be used in accordance with the present invention. Simple numerical identifiers may be used, as well.

Figure 6:
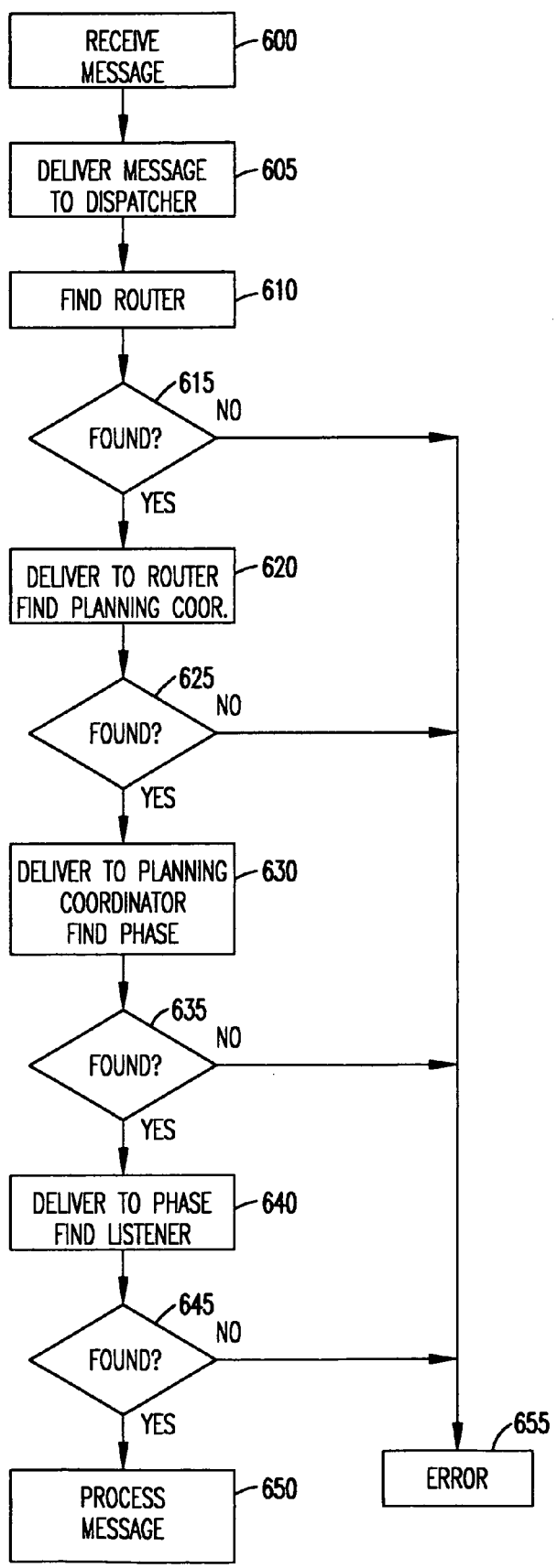
FIG. 6 is a flow diagram showing the steps of message delivery in accordance with the present invention.

FIG. 6 is a flow diagram outlining message delivery and processing in accordance with the present invention. At step 600, a message is received. The method of message entry may be, for example, network-based delivery, process generated, or received by any number of message-based delivery schemes. At step 605, the message is then handed to the dispatcher. The dispatcher obtains the router address from the message, and from a list of routers the dispatcher maintains, searches for the router component at step 610.

At step 615, a determination is made as to whether the router component is found. If not, an error is processed at step 655. If found, the message is delivered to the router at step 620. The router, at step 620, then obtains the coordinator address from the message in order to find the corresponding planning coordinator. At step 635, a determination is made as to whether the planning coordinator is found. If not, an error is processed at step 655. If found, the message is delivered to the planning coordinator at step 630. The planning coordinator, at step 630, then obtains the phase address from the messages in order to find the corresponding phase. At step 635, a determination is made as to whether the corresponding phase is found. If not, an error is processed at step 655. If found, the message is delivered to the phase and the phase searches for the listener corresponding to the listener address on the message at step 640. At step 645, a determination is made as to whether the corresponding listener is found. If not, an error is processed at step 655. If found, the phase hands the message to the listener which, in turn, processes the message at step 650.

Listeners generally, but not exclusively, are paired with messages. The address of the listener is generated by the system through the generation of unique identifiers. Therefore, messages may originate from arbitrary sources, provided they are received by the system in a uniform manner. Thus, messages may originate from both internal and external processes or devices. This also includes the possibility of messages originating from other phases, or from other systems, whether they be the same or different types of systems.

Figure 7A:
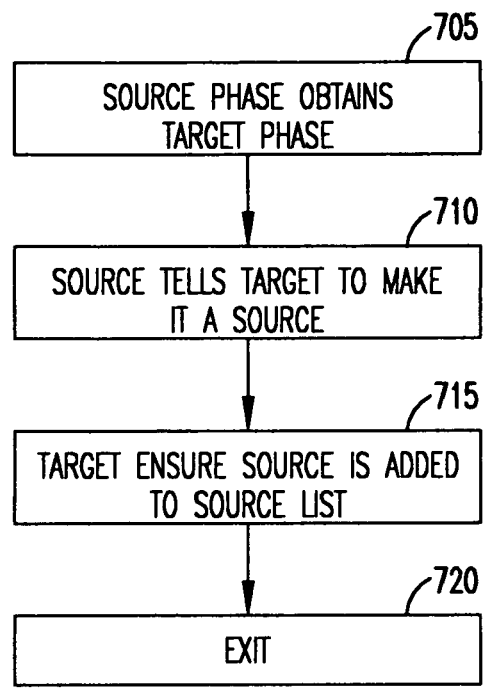
FIG. 7A is a flow diagram showing a source phase spawning a target phase in accordance with the present invention.
Figure 7B:
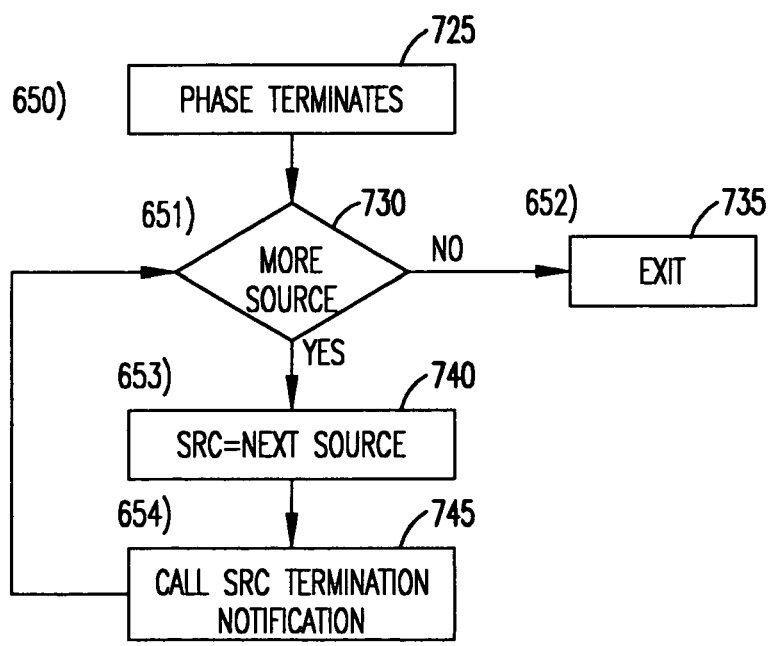
FIG. 7B is a flow diagram showing the steps of termination and termination notification in accordance with the present invention.

FIGS. 7A and 7B are flow diagrams showing the process by which one phase, referred to as the source, becomes dependent and reacts on the termination of another phase, referred to as the target. For example, in FIG. 2, the phase 205 would be the source phase and the phases 210 and 215 would be the target phases. In embodiments of the present invention, the source phase has a mechanism for receiving notification of completion of the target; likewise, the target may have a mechanism for sending a notification of completion. The source phase may also have a well defined method that can be called by the target for notification. In object-oriented methods, for example, this could be a virtual method of the phase object which can be overridden by subclasses of the phase object type.

More specific, FIG. 7A shows a flow diagram for the source becoming dependent on the target. At step 705, the source phase obtains the target phase to which it will become dependent on termination. How it obtains the target phase is a matter of implementation and may involve, for example, finding phases that are published to the system or retained in lists passed throughout the system. At step 710, the source phase passes itself to the target phase to be added as a dependent. At step 715, the target phase ensures that the source phase is added to the list of target phases. At step 720, the process ends.

FIG. 7B shows a diagram of phase termination and the notification of target phases. At step 725, the phase is in a state of termination. At step 730, the phase proceeds to loop over its list of source phases by first checking if any more source phases exist. If none exist, the process terminates at step 735. Otherwise, the next source is obtained at step 740. The source phase notification method is called at step 745, with a return to the check for more source phases at step 730.

The system and method of the present invention may be applied as a single process execution system, where all phases execute within that process, and asynchronous messages may be with other phases of that system or to external systems. It is also contemplated by the present invention that several of the systems may run on an arbitrary number of processors, with the possibility of multiple systems running on any one process. This latter contemplated scenario includes any phase of one system to asynchronously message other phases of other systems using the messaging methodology described herein. This alternatively contemplated scenario may also include messaging with external systems.

Ancillary details to the teachings of the present invention include maintenance details common to building complex software systems. These include, but are not limited to, the allocation and registration of phases, the deregistration and deallocation of phases, and recovery from exceptions due to unforeseen circumstances (e.g. network failures) or through dependencies on software outside the essentials of this teaching (e.g. operating systems).

While the invention has been described in terms of a single preferred embodiment, those skilled in the art will recognize that the invention can be practiced with modification within the spirit and scope of the appended claims.

Having thus describe our invention, what we claim as new and desire to secure by Letters Patent is as follows:

1. A method for performing event-driven computations on individual phases in a plan that itself dynamically responds to changes and devises its own course of action, comprising the steps of:
   providing cooperating source phases for performing computations, where each of the cooperating source phases executes independently and include an associated program for performing the computations;
   creating at least one target phase from at least one of the cooperating source phases, the at least one target phase performing target phase computations; and
   initiating an asynchronous transaction for specific and separate phases of the at least one target phase or the cooperating source phases with a remote agent or another phase such that events can be directed to the specific and separate phases,
   wherein the each of the specific and separate phases asynchronously coordinates to external events by waiting on completion of a transaction and receipt of a message of external information prior to completion of the computations or the target phase computations, and identifies a receipt message corresponding to the asynchronous transaction.

2. The method of claim 1, further comprising the step of notifying the cooperating source phases of completion of the target phase computations, wherein, upon notification, the cooperating source phases perform further tasks.

3. The method of claim 2, wherein the cooperating source phases receiving the notification and the at least one target phase sends the notification.

4. The method of claim 1, wherein respective cooperating source phases are dependent on respective target phases of the at least one target phase, and performs the computations after completion of each target phase computation associated with a respective cooperating source phase.

5. The method of claim 1, further comprising the step of receiving timed notification for termination for any pending asynchronous transaction.

6. The method of claim 5, wherein, upon the timed notification, the cooperating source phases perform further tasks.

7. The method of claim 1, further comprising the step of receiving timed notification for termination of the each cooperating source phase.

8. The method of claim 1, further comprising the step of providing event listeners associated with the at least one target phase or the cooperating source phases, the event listeners providing selected ones of the at least one target phase and the cooperating source phases with external event-driven information such that the selected ones of the cooperating source phases and the at least one target phase respond to changes associated with the external event-driven information.

9. The method of claim 8, further comprising the steps of:
   sending an external request by a target phase of the at least one target phase; and
   routing a message in response to the request via the event listener to the at least one target phase.

10. The method of claim 9, wherein the message is first routed via a dispatcher to a planning coordinator.

11. The method of claim 10, wherein the message includes planning address information that identifies (i) the planning coordinator, (ii) phase and (iii) event listener for routing the message.

12. The method of claim 1, wherein each cooperating source phase and the at least one target phase executes independently of each other.

13. The method of claim 1, further comprising the step of retracting one of the at least one target phases.

14. The method of claim 1, wherein the plan is event-driven, each of the cooperating source phases includes event listeners, and the plan includes a dispatcher, routers, and a planning coordinator, and wherein the method further comprises:

keeping track, with the planning coordinator, of an execution of the plan; and mapping events to the event listeners of each of the cooperating source phases.

15. A system for performing event-driven computations on individual phases in a plan that itself dynamically responds to changes and devises its own course of action, comprising:

means for providing cooperating source phases for performing computations, where each of the cooperating source phases executes independently and include an associated program for performing the computations;

means for creating at least one target phase from at least one of the cooperating source phases, the at least one target phase performing target phase computations; and means for initiating an asynchronous transaction for specific and separate phases of the at least one target phase or the cooperating source phases with a remote agent or another phase such that events can be directed to the specific and separate phases, wherein the each of the specific and separate phases asynchronously coordinates to external events by waiting on completion of a transaction and receipt of a message of external information prior to completion of the computations or the target phase computations, and identifies a receipt message corresponding to the asynchronous transaction.

16. The system of claim 15, further comprising means for routing the message of external information to one of the cooperating source phases or one or more of the at least one target phases.

17. The system of claim 16, wherein the means for routing includes:

a dispatcher;

at least one router, the dispatcher providing the message of external information to a predetermined one of the at least one router based on message information associated with the message the of external information; and at least one planning coordinator, the predetermined router providing the message of external information to a predetermined one of the at least one planning coordinator based on the message information associated with the message of external information, wherein the predetermined planning coordinator provides the message of external information to an event listener associated with one of the cooperating source phases or the at least one target source form completion.

18. The system of claim 15, wherein the plan is event-driven, each of the cooperating source phases includes event listeners, and the plan includes a dispatcher, routers, and a planning coordinator that keeps track of an execution of the plan and maps events to the event listeners of each of the cooperating source phases.

19. A machine readable medium containing code for performing event-driven computations on individual phrases in a plan that itself dynamically responds to changes and devises its own course of action, the code implementing steps of:

providing cooperating source phrases for performing computations where each of the cooperating source phrases executes independently and include an associated program for performing the computations;

creating at least one target phase from at least one of the cooperating source phases, the at least one target phase performing target computations; and initiating an asynchronous transaction for specific phases of the at least one target phase or the cooperating source phase with a remote agent or another phase such that events can be directed to the specific phases, wherein the each of the specific phases asynchronously coordinates to external events by waiting on completion of transaction and receipt of a message of external information and identifies a receipt message corresponding to the asynchronous transaction.

20. The machine readable medium of claim 19, wherein the plan is event-driven, each of the cooperating source phases includes event listeners, and the plan includes a dispatcher, routers, and a planning coordinator, and wherein the code further implements the steps of:

keeping track, with the planning coordinator, of an execution of the plan; and mapping events to the event listeners of each of the cooperating source phases.

* * * * *